(12) United States Patent
Haas et al.

(10) Patent No.: US 6,187,363 B1
(45) Date of Patent: Feb. 13, 2001

(54) METHOD OF MANUFACTURING EDIBLE WAFFLE PRODUCTS

(75) Inventors: Franz Haas, Vienna; Johann Haas, Klosterneuburg; Karl Tiefenbacher, Vienna, all of (AT)

(73) Assignee: Franz Haas Waffelmaschinen-Industrie Aktiengesellschaft, Vienna (AT)

( * ) Notice: Under 35 U.S.C. 154(b), the term of this patent shall be extended for 0 days.

(21) Appl. No.: 09/180,386

(22) PCT Filed: Jun. 13, 1997

(86) PCT No.: PCT/AT97/00128

§ 371 Date: Nov. 6, 1998

§ 102(e) Date: Nov. 6, 1998

(87) PCT Pub. No.: WO97/47205

PCT Pub. Date: Dec. 18, 1997

(30) Foreign Application Priority Data

Jun. 13, 1996 (AT) .................................................. 1039/96

(51) Int. Cl.⁷ .................................................. A21D 10/00
(52) U.S. Cl. ........................... 426/549; 426/94; 426/138; 426/139; 426/496

(58) Field of Search .............................. 426/94, 549, 138, 426/139, 496

(56) References Cited

U.S. PATENT DOCUMENTS 3,721,570 * 3/1973 Linteris .................................. 99/123
3,949,094 * 4/1976 Johnson et al. ......................... 426/99

FOREIGN PATENT DOCUMENTS

| 625683 | * | 7/1949 | (GB) . |
| 670955 | * | 4/1952 | (GB) . |
| 756549 | * | 9/1956 | (GB) . |
| 924268 | * | 4/1963 | (GB) . |

* cited by examiner

*Primary Examiner*—Lien Tran
(74) *Attorney, Agent, or Firm*—Herbert Dubno

(57) ABSTRACT

A baked product in the form of waffles or wafers can be made from a mass which is comprised of flour, oils, fats and lecithin-containing additives, and water by baking in a baking mold, on drum or belt. At least a partial substitute for the lecithin containing component is monostearyl citrate which is added and is effective to facilitate separation of the product from the baking surface.

5 Claims, No Drawings

METHOD OF MANUFACTURING EDIBLE WAFFLE PRODUCTS

CROSS REFERENCE TO RELATED APPLICATIONS

This application is a national stage of PCT/AT 97/00128 filed Jun. 13, 1997 and based, in turn, upon Austrian National application A 1039/96 of Jun. 13, 1996 under the International Convention.

FIELD OF THE INVENTION

The present invention relates to a method of manufacturing edible waffle products.

Traditionally waffles are produced as thin-walled baked goods, considerably loosened by steam, in single or multiple section baking molds (flat and hollow waffles, wafers, ice cream cones, soft waffles), baked in drum-type ovens or on endless baking belts (hollow rolled pancakes).

In the specialty and patent literature there are numerous indications of typical recipes. Besides wheat flour and optionally starch flours, these contain certain proportions of oil/fats, lecithin-containing additives (e.g. lecithin in liquid or powder form, egg or soybean products). The two latter groups of substances serve primarily for an easy and safe detachment of the finished baked waffle product from the surface of the baking mold. In this connection here are a few literature examples:

1. E. Winter (1995) ZSW, Zucker- und Süsswaren, 49, 450–2
2. Encyclopaedia of Food Science, Food Technology and Nutrition (1993), vol 1, 417–20, Academic Press, London
3. D. Manley (1991) Technology of Biscuits, Crackers and Cookies, 2nd Ed., 299–313, Ellis Horwood, New York
4. German Open Application DE-OS 4042255 A1
5. DE-OS 3912341 A1
6. East German Application DE-PS 145196
7. German Patent Application DE-PS 2929496 C2.

The problemfree removal of such baked goods from the mold is a basic criterium for a troublefree, continuous production, which in certain cases can even lead to a tendency to overdose the substances with an antiadhesive effect.

On the other hand, it is known that various lipids, especially when containing unsaturated fatty acids such as lecithin, or most of the oils promote the formation of crust residues on the baking molds for waffles on the baking belts for hollow rolled pancakes and biscuits, thereby causing their contamination during continuous operations.

Therefore many attempts have been made to find other more stable and effective means, see for instance DD-PS 145196.

DESCRIPTION OF THE INVENTION

Surprisingly it has been found that a substance heretofore used solely as a complexing agent in margarine, namely stearyl citrate, can serve as a partial and/or total substitute for lecithin and/or oil/fats in the mentioned baked goods, and thereby can have in addition to the "antiadhesive effect" also an obvious "cleaning effect" on the baking molds, or at least can prevent or reduce the formation of the aforedescribed residue.

This is even more surprising, because due to the free acid groups of the citric acid residue, no person skilled in the art would add acid food additives in the production of waffles and other non-perishable baked goods.

As shown by the recipes tested so far, it is thereby possible to reduce the proportion of or to eliminate completely the lecithin and also to eliminate oils and fats partially or completely.

This again increases the storage stability of the products. Rancidity and stale taste due to the oxidation of lipid components spread over a large production surface are today the most important indications of spoilage. It can also be assumed that this is supported by the action of the citric acid residue, known to act as a synergist and a complexing agent for traces of metals.

On the other hand it is possible to raise the baking temperature, thereby accelerating the baking process, since the lecithin, which is particularly thermally unstable, can be effectively replaced.

Even with moderate amounts of this additive a smooth, glossy surface of the baking molds can be obtained, as contrasted with the case of comparable dosages of lecithin or fat. As of now it can only be assumed that this is caused by special emulsifying effects of these substances, or by a surface enrichment of the kind of a genuine detaching agent. An increase of the contact angle of water droplets results. A certain hydrophobic effect is also related to this increase of the contact angle. Compared to the standard recipes, there is also improved flexibility, e.g. reduced breakability of the waffle product.

Chemically according to the preparation specifications, the monostearyl citrate (MSC) is a mixture of mono and distearyl citrate esters, which show an oil-soluble chelating effect. The long fatty acid residues mediate the oil solubility, the free carboxyl groups mediate the complexing effect.

The CAS number is 1337-33-3. The melting point equals 47° C., The solubility in oil is approximately 1% by weight.

The used product was acquired from Reilly Chemicals in Brussels, Belgium and ground. The manufacturer is Morflex, Inc. Greensboro, N.C., USA.

In the USA the following approvals are given for stearyl citrate by the FDA in the Code of Federal Regulations (CFR) Vol. 21:

GRAS as a complexing agent up to 0.15% (21 CFR 182.685)

Use as softener in packaging materials for foods (21 CFR 181.27)

as softener for resin-like and polymer coverings (21 CFR 175.300)

Components for paper, cardboard in contact with watery or fatty foods (21 CFR 176.170).

The admixture of stearyl citrate in powder form—preferred grain size smaller than 500 microns—takes place together with other microadditives in powder form. At concentration of over 0.5 parts by weight stearyl citrate to 100 parts of flour, advantageously the concentration of sodium hydrogen carbonate is increased, in order to prevent a too strong decrease of the pH-value of the dough, so that it does not fall below 5.0, preferably not under 6.0.

The lowest limit of effectiveness lies at 0.025 part by weight to 100 parts of flour, the upper limit at about 5 parts by weight to 100 parts of flour.

The invention is closer explained with the aid of the following examples.

| Flat Waffles Compared Partially Substituted Substituted | | | | | |
|---|---|---|---|---|---|
| Component | No. 1 | 2 | 3 | 4 | 5 |
| Flour | 100 | 100 | 100 | 100 | 100 |
| Sugar | — | — | — | — | — |
| Baking powder | 0.3 | 0.3 | 0.3 | 0.35 | 0.4 |
| Salt | 0.5 | 0.5 | 0.5 | 0.5 | 0.4 |
| Oil, partially hydrogenated | 1 | 0.5 | 0 | 0 | 0 |
| Soybean lecithin | 0.5 | 0 | 0 | 0 | 0 |
| Stearyl citrate | 0 | 0.25 | 0.5 | 1 | 1.5 |
| Lecithin baking agent | — | — | — | — | — |
| Water | 140 | 140 | 140 | 140 | 140 |

| Straw Cone Compared Partially Substituted Substituted | | | | | |
|---|---|---|---|---|---|
| Component | No. 6 | 7 | 8 | 9 | 10 |
| Flour | 75 | 75 | 75 | 75 | 75 |
| Starch | 25 | 25 | 25 | 25 | 25 |
| Sugar | — | — | — | — | — |
| Baking soda | 0.5 | 0.5 | 0.5 | 0.5 | 0.6 |
| Salt | — | — | — | — | — |
| Oil, partially hydrogenated | 1 | 0.5 | 0.5 | 0 | 0 |
| Soybean lecithin | 0.25 | 0 | 0 | 0 | 0 |
| Stearyl citrate | 0 | 0.25 | 0.5 | 1 | 1.5 |
| Egg powder | — | — | — | — | — |
| Lecithin baking agent | 1 | 1 | 0 | 0 | 0 |
| Water | 130 | 130 | 130 | 130 | 130 |

| Rolled Sugar Cones Compared Partially Substituted Substituted | | | | | |
|---|---|---|---|---|---|
| Component | No. 11 | 12 | 13 | 14 | 15 |
| Flour | 93 | 93 | 93 | 93 | 93 |
| Starch | 7 | 7 | 7 | 7 | 7 |
| Sugar | 40 | 40 | 40 | 40 | 40 |
| Baking powder | 0 | 0 | 0 | 0.2 | 0.4 |
| Salt | 0.33 | 0.33 | 0.33 | 0.33 | 0.33 |
| Oil, partially hydrogenated | 5.3 | 2.7 | 2.7 | 1.3 | 0 |
| Soybean lecithin | — | — | — | — | — |
| Stearyl citrate | 0 | 0.5 | 1 | 2 | 4 |
| Lecithin baking agent | 4.7 | 2.3 | 0 | 0 | 0 |
| Water | 123 | 123 | 123 | 123 | 123 |

| Hollow Rolled Pancakes Compared Partially Substituted Substitute | | | | | |
|---|---|---|---|---|---|
| Component | No. 16 | 17 | 18 | 19 | 20 |
| Flour | 100 | 100 | 100 | 100 | 100 |
| Cacao powder | 0 | 0 | 0 | 0 | 1.5 |
| Sugar | 75 | 75 | 75 | 75 | 75 |
| Milk powder | 5 | 5 | 5 | 5 | 3.5 |
| Baking soda | 0 | 0 | 0.1 | 0.2 | 0.3 |
| Salt | 0.3 | 0.3 | 0.3 | 0.3 | 0.3 |
| Oil, partially hydrogenated | 2.5 | 2.5 | 1.25 | 0 | 0 |
| Soybean lecithin | 0.75 | 0 | 0 | 0 | 0 |
| Stearyl citrate | 0 | 0.5 | 1 | 2 | 2.5 |
| Egg powder | 2 | 2 | 2 | 2 | 1.5 |
| Lecithin baking agent | 0.5 | 0 | 0 | 0 | 0 |
| Water | 125 | 125 | 125 | 125 | 125 |

| Soft Waffles Compared Partially Substituted Substituted | | | | | |
|---|---|---|---|---|---|
| Component | No. 21 | 22 | 23 | 24 | 25 |
| Flour | 100 | 100 | 100 | 100 | 100 |
| Starch | 5 | 5 | 5 | 5 | 5 |
| Sugar | 20 | 20 | 20 | 20 | 20 |
| Baking soda | 1.5 | 1.5 | 1.5 | 1.6 | 1.75 |
| Salt | 0.5 | 0.5 | 0.5 | 0.5 | 0.5 |
| Butter | 28 | 28 | 28 | 28 | 21 |
| Soybean lecithin | 0.5 | 0 | 0 | 0 | 0 |
| Stearyl citrate | 0 | 0.25 | 0.5 | 1 | 2 |
| Fresh egg | 33 | 33 | 33 | 33 | 33 |
| Lecithin baking agent | 2.5 | 2.5 | 0 | 0 | 0 |
| Water | 95 | 95 | 95 | 95 | 95 |

What is claimed is:

1. In a method of making a baked product from the group which consists of waffles and wafers wherein a mass comprising flour, at least one component selected from the group which consists of oils, fats, and lecithin-containing additives and water is baked on a surface of a baking mold, a drum or a belt, the improvement which comprises the step of adding to said mass as at least a partial substitute for said component, an amount of monostearyl citrate effective to facilitate separation of said product from said surface.

2. The improvement defined in claim 1 wherein said monostearyl citrate is present in said mass at a concentration of 0.025 to 5% by weight of the flour.

3. The improvement defined in claim 1 wherein said monostearyl citrate is present in a concentration of 5.0% by weight of said flour and said mass contains sodium hydrogen carbonate in an amount sufficient to prevent reduction of the pH of said mass below 5.0.

4. The improvement defined in claim 3 wherein the content of sodium hydrogen carbonate in said mass is adjusted to prevent a reduction of the pH value thereof below 6.0.

5. The improvement defined in claim 1 wherein said monostearyl citrate has a grain size of less than 500 $\mu$m.

* * * * *